(No Model.)
W. H. ELWELL.
MEANS FOR ACTUATING WINDOW BLINDS.
No. 536,423. Patented Mar. 26, 1895.
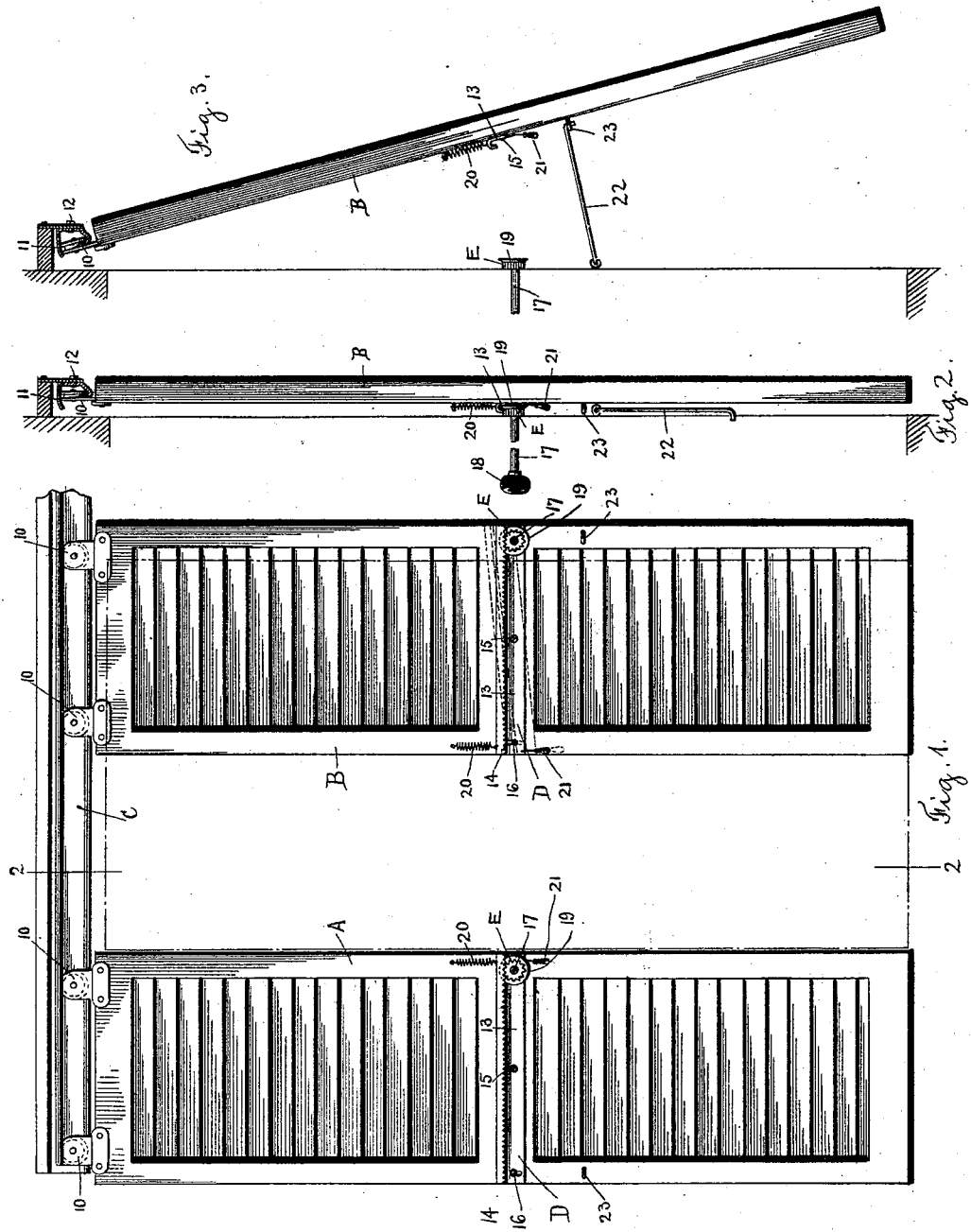
Witnesses.
Chas. F. Schwelz
W. J. Baldwin
Inventor.
W. H. Elwell,
By Southgate & Southgate
Attorneys

UNITED STATES PATENT OFFICE.

WILLIAM H. ELWELL, OF WORCESTER, MASSACHUSETTS, ASSIGNOR, BY DIRECT AND MESNE ASSIGNMENTS, TO SARAH F. ELWELL, FREDERICK A. BARNES, AND FRANKLIN E. BARNES, OF SAME PLACE.

MEANS FOR ACTUATING WINDOW-BLINDS.

SPECIFICATION forming part of Letters Patent No. 536,423, dated March 26, 1895.

Application filed November 28, 1894. Serial No. 530,217. (No model.)

*To all whom it may concern:*

Be it known that I, WILLIAM H. ELWELL, a citizen of the United States, residing at Worcester, in the county of Worcester and State of Massachusetts, have invented a new and useful Improvement in Means for Actuating Window-Blinds, of which the following is a specification.

My invention relates to that class of sliding window-blinds which may be swung outwardly to form an awning.

The object of my invention is to provide strong, simple and efficient means for actuating and controlling window-blinds of the class referred to.

To these ends, my invention consists of the parts and combinations of parts as hereinafter described and more particularly pointed out in the claims at the end of this specification.

In the accompanying drawings, Figure 1 is a rear elevation of a pair of blinds constructed according to my invention, the location of the window opening being indicated by dotted lines. Fig. 2 is a sectional view taken on the line 2—2 of Fig. 1, and Fig. 3 is a similar view, the parts being shown in a different relative position.

Window-blinds which are constructed according to my invention are movably mounted on an over-head track, and are actuated by means of a two-part actuating mechanism, as a rack and pinion, means being provided for disengaging the rack and pinion whenever it is desired to swing the blinds outwardly to form an awning.

Referring to the drawings and in detail, A and B designate a pair of window-blinds having grooved rollers 10, which may move upon and turn about an over-head track C. The track C, which I preferably employ is inclosed or extends inwardly, as shown most clearly in Figs. 2 and 3, and is provided with a guide-plate 11, which will retain the rollers upon the track, and which is adjustably secured in place by means of small bolts or screws 12. Near its center, each of the blinds A and B is provided with a pivoted rack D. The racks D are preferably constructed of sheet-metal, and are provided with a body portion 13 and an overhanging or rack portion 14, and, as thus constructed, each of the racks is mounted upon a central pivot or screw 15, and is slotted near each end to engage small screws 16. Meshing with each of the racks D, I provide an actuating pinion E, which is secured to or fastened upon a suitable actuating shaft 17. The shaft 17 extends through to the inside of the house, and is journaled in the window-framing in any suitable manner, and is provided at its inner end with a knob or handle 18.

It is obvious that small cranks may be substituted for the operating knobs or handles, if preferred.

As shown most clearly in Figs. 2 and 3, the gears or pinions E are each provided with an extending flange or projection 19, which will normally engage behind the over-hanging section of the rack D, and will retain the blind in a vertical position, preventing it from being swung outwardly or turning about the track C. Small coiled springs 20 are secured to the inner ends of the pivoted racks, and normally hold them in a horizontal position.

When one of the blinds is in its closed position or opposite the window opening, the inner end of the pivoted rack may be moved downwardly against the tension of the coiled spring 20 by means of a small handle 21, thus throwing up the opposite end of the rack, and disengaging the rack and gear, leaving the blind free to be swung outwardly, as illustrated in Fig. 3.

22 designates a suitable brace or rod, which may be pivoted to the window casing, and may engage a suitable screw-eye 23 to hold the blind in its outward position, as illustrated in Fig. 3.

While I prefer to locate the pivoted rack near the center of the blind, thus bringing the operating handle into a convenient position, and dispensing with all guides or fixtures at the bottom of the blind, it is obvious that the rack may be located in any other desired position.

I am aware that many changes may be made in the construction of my improved blind operating mechanism by those who are skilled in the art, and I do not wish, therefore, to be limited to the construction which I have shown and described, but What I do claim, and desire to secure by Letters Patent of the United States, is—

1. The combination of a blind, a track or way upon which said blind may slide and turn outwardly, a two-part actuating mechanism for opening and closing said blind, one part being carried by the blind and the other part extending to the interior of the house, and means for disconnecting said actuating mechanism to allow the blind to be swung outwardly, substantially as described.

2. The combination of a blind, a track or way located near the top of the window upon which the blind may slide and turn outwardly, a rack carried by said blind, a gear engaging the rack and normally retaining the blind in a vertical position, and means for disengaging the rack and gear to allow the blind to be swung outwardly, substantially as described.

3. The combination of an overhead track, a blind mounted upon and adapted to turn outwardly about said track, a pivoted rack carried by said blind, an actuating gear or pinion engaging said rack and a spring for normally holding the rack and gear in engagement, substantially as described.

4. The combination of an overhead track, a blind having rollers adapted to travel upon and to turn about said track, an overhanging rack carried by said blind, an actuating gear or pinion having a projecting flange which is adapted to engage behind and normally hold said blind in a vertical position, and means for disengaging said rack and pinion, substantially as described.

5. The combination of a blind having grooved rollers 10 mounted upon an overhead track C, a guide-plate 11 for holding the rollers upon the track, an overhanging pivoted rack D carried by said blind, and an actuating pinion E engaging said rack, substantially as described.

6. In a mechanism for actuating window-blinds, the combination of an over-hanging, pivoted, sheet-metal rack D, an actuating pinion E having an extending flange 19 adapted to engage behind the overhanging portion of said rack, and a spring 20 for normally holding the rack and gear in engagement, substantially as described.

In testimony whereof I have hereunto set my hand in the presence of two subscribing witnesses.

WILLIAM H. ELWELL.

Witnesses:
LOUIS W. SOUTHGATE,
FREDERICK A. BARNES.